(12) United States Patent
Hiekel

(10) Patent No.: US 8,768,557 B2
(45) Date of Patent: Jul. 1, 2014

(54) HORIZONTAL ORDER-PICKER

(75) Inventor: Oliver Hiekel, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 124 days.

(21) Appl. No.: 13/152,535

(22) Filed: Jun. 3, 2011

(65) Prior Publication Data

US 2011/0301801 A1   Dec. 8, 2011

(30) Foreign Application Priority Data

Jun. 4, 2010   (DE) .......................... 10 2010 022 678

(51) Int. Cl.
*G01C 22/00*   (2006.01)

(52) U.S. Cl.
USPC .......................................................... 701/25

(58) Field of Classification Search
USPC .................... 701/2, 25; 182/2.2, 12, 113, 141
See application file for complete search history.

(56) References Cited

U.S. PATENT DOCUMENTS

| | | | |
|---|---|---|---|
| 4,309,758 A * | 1/1982 | Halsall et al. ................... 701/23 |
| 2007/0074935 A1 * | 4/2007 | Zahn .............................. 182/141 |
| 2008/0071429 A1 * | 3/2008 | Kraimer et al. .................... 701/2 |
| 2008/0129445 A1 * | 6/2008 | Kraimer et al. ................ 340/5.2 |
| 2010/0114405 A1 | 5/2010 | Elston et al. |
| 2011/0180349 A1 * | 7/2011 | Beji .............................. 182/148 |
| 2011/0301801 A1 * | 12/2011 | Hiekel ............................ 701/25 |
| 2013/0017842 A1 * | 1/2013 | Gupta et al. ............... 455/456.1 |

\* cited by examiner

*Primary Examiner* — Redhwan K Mawari
(74) *Attorney, Agent, or Firm* — Vidas, Arrett & Steinkraus

(57) ABSTRACT

A horizontal order picker with an operating platform and a load section which is provided for accommodating at least one order-picking container, wherein an operational control is provided in the operating platform, upon actuation of which the horizontal order picker moves for a predetermined distance (D) automatically, the length of the distance (D) corresponding to the offset between the operating platform and one of the order-picking containers.

6 Claims, 2 Drawing Sheets

HORIZONTAL ORDER-PICKER

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention is related to a horizontal order-picker with an operating platform and a load section which is provided for accommodating at least one order-picking container.

During the process of order picking, the operator drives the order-picker to a predetermined location, from where the goods to be commissioned can be put into the order-picking container. In the technical language of the field, this location is designated as pick-up point or pick. Statistics furnish evidence that for the overall commissioning process, approximately 60% of the time is spent for commissioning, namely for picking up the goods from the storage facility and stowing them into the order-picking containers, and 40% for travelling between the pick-up points. At big storage facilities, in which several millions of goods are commissioned per week, statistics yielded the result that each second of time saving in commissioning results in quite significant cost-saving with respect to the year.

In the conventional commissioning process, the operator has to cover the distance between the pick-up point and the order-picking container several times, as well as one time that between the order-picking container and the operating platform of the horizontal order-picker. This movement between the three points is time-consuming.

From the USA, a horizontal order-picker is known with a function in which the driver jumps out of the travelling vehicle, and the vehicle continues to travel a certain distance automatically by the blocking of the brake. Thus, the order-picking container which is normally situated behind the operator in the travel direction, is brought nearer to the position of the driver. Such a function, where a driver leaves the travelling vehicle, is not compatible with German and European safety regulations for floor conveyors.

BRIEF SUMMARY OF THE INVENTION

The present invention is based on the objective to provide a horizontal order-picker which reduces the distance between the pick-up point and the order-picking container in a manner that is compatible with the safety regulations.

According to the present invention, the objective is achieved by a horizontal order-picker having the features of patent claim 1 Advantageous embodiments form the subject matter of the sub-claims.

The horizontal order-picker of the present invention has an operating platform and a load section, which is provided to accommodate at least one order-picking container. Usually, the operating platform is situated before the order-picking containers in the travel direction of the horizontal order-picker. According to the present invention, an operational control is provided in the operating platform, upon actuation of which the horizontal order-picker moves automatically for a predetermined distance, the length of the distance corresponding to the offset between the operating platform and one of the order-picking containers. In difference to the solution used in the USA, according to the present invention an operational control is required that has to be actuated by the driver in order to move the horizontal order-picker automatically. The travelled distance is exactly decided in this and it corresponds to the offset between the operating platform and one of the order-picking containers. The horizontal order-picker according to the present invention permits that the operator travels to a pick-up point, stops the vehicle at this pick-up point and exits the standing vehicle. Then, through the actuation the operational control, the vehicle travels automatically such that one of the order-picking containers is exactly within reach of the pick-up point. Through this, the ways of the operator between pick-up point and order-picking container can be saved. In order to continue travelling, it is only required that the operator covers the distance from pick-up point to operating platform one time.

In a practical embodiment, the movement direction is selected such that after movement, one of the order-picking containers is in a position in which the operating platform had been before the movement.

In a particularly preferred embodiment, the load section of the horizontal order-picker according to the present invention has several order-picking containers disposed one after another in the travel direction in order to permit to accommodate the goods to be commissioned. In this embodiment, the operational control has means which permit to select one of the several order-picking containers, wherein the length of the distance to be moved corresponds to the offset between the selected order-picking container and the operating platform. Thus, when leaving the vehicle, the operator can select which order-picking container is to be moved into a position that is optimum for loading.

In another preferred embodiment, the operational control triggers a movement of the horizontal order-picker after the vehicle had been braked down into standstill. In this embodiment, the driver has complete control of the vehicle until it has been brought to standstill. Only after leaving the standing vehicle, it is automatically moved through the triggering of the operational control.

A sensor is advantageously provided in the horizontal order-picker, which acquires the distance to be moved and stops the automatic movement process when an obstacle appears. Such a sensor may be radar for instance, but other sensors are also conceivable. It is completely sufficient for the invention when the sensor acquires only the region before the vehicle up to a distance about which the vehicle is to be moved. This permits to use simple sensors with a small range of reach.

BRIEF DESCRIPTION OF THE SEVERAL VIEWS OF THE DRAWINGS

The present invention will be explained in more detail in the following by means of the figures.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
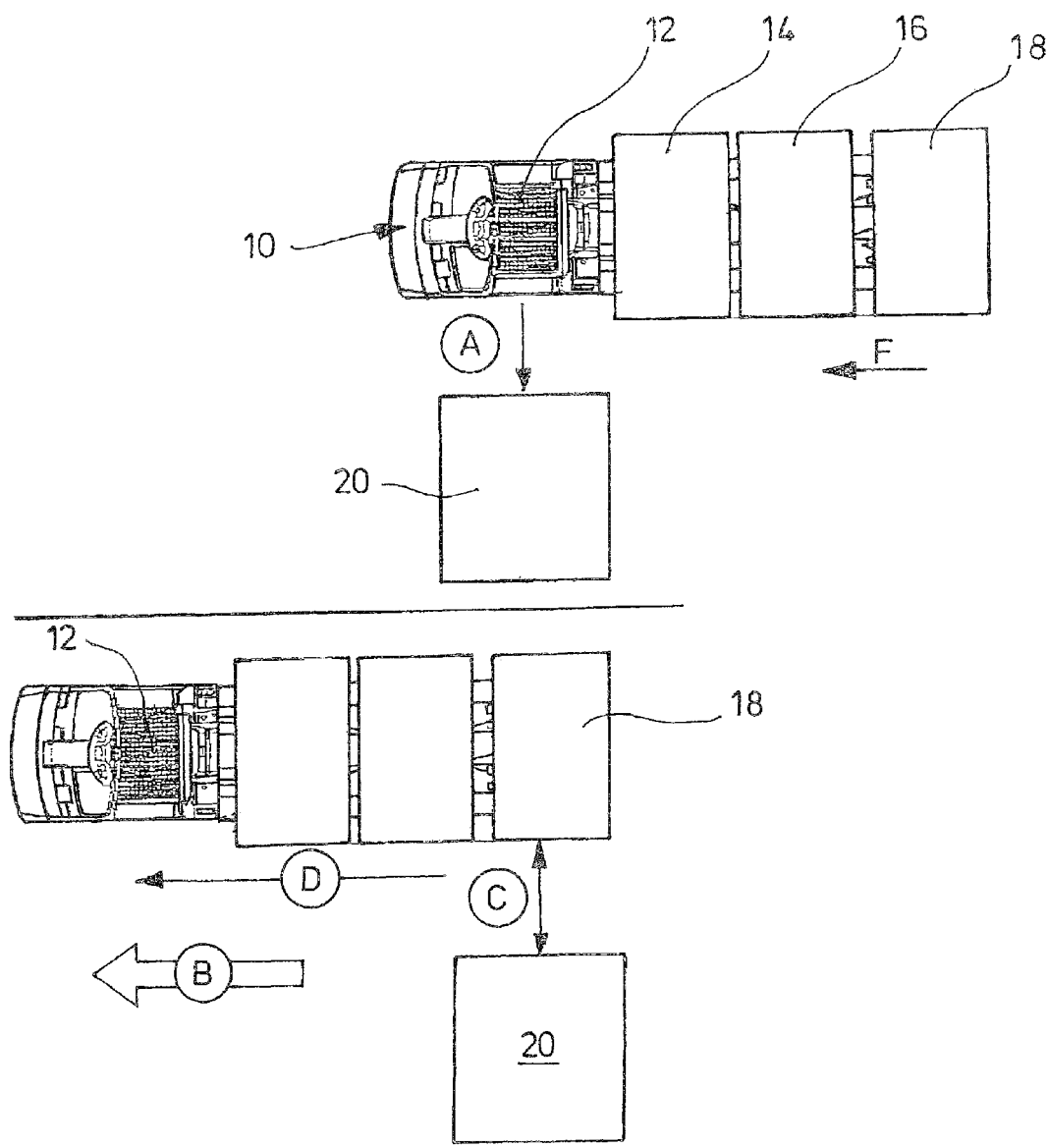
FIG. 1 shows the process of the automatic positioning of the horizontal order-picker.

In its upper part, FIG. 1 shows a horizontal order-picker 10 with an operating platform 12 and three order-picking containers 14, 16, 18. The usual movement direction of the horizontal order-picker 10 is indicated by the arrow F. During the commissioning process, an operator advances to the pick-up point 20. Directly within reach of the pick-up point 20, there are racks with the goods to be commissioned (not shown). During the commissioning process, the driver leaves the operating platform 12 and goes to the pick-up point 20 and covers the distance A by doing so.

As shown in the lower part of FIG. 1, thereafter the vehicle automatically moves about the distance B, so that no longer the operating platform 12, but instead the order-picking container 18 is in the direct neighbourhood of the pick-up point 20. Now, the driver can put the goods to be commissioned into the order-picking container 18. For this purpose, he covers the distance C several times. After completion of the commissioning process, the operator goes back to the operating platform 12 along the distance D.

All in all, the driver of the commissioning process covers the distances A and D one time, and several times the distance C.

Figure 3:
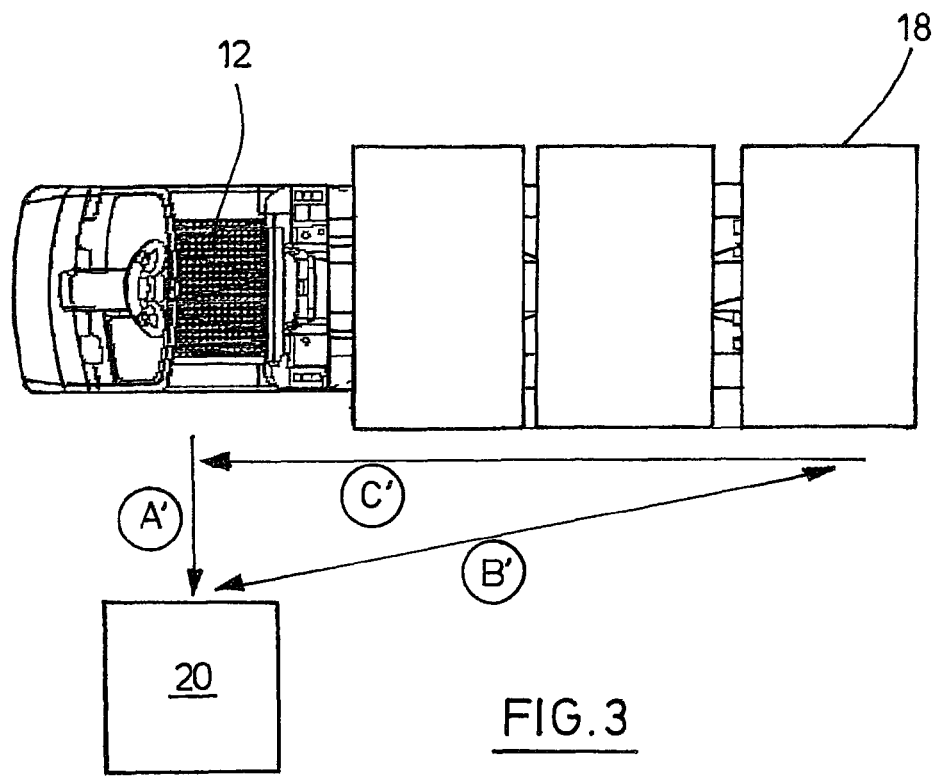
FIG. 3 shows the commissioning process of the state of the art.

FIG. 3 shows the distances covered by the driver in conventional commissioning. In this commissioning process, the driver advances to the pick-up point 20 anew and leaves the operating platform 12. In doing so, he covers the distance A'. In the following, the goods to be commissioned are picked up in the pick-up point 20 and stocked in the order-picking container 18. For this purpose, the operator covers the distance B' several times. After the last good to be commissioned had been put into the order-picking container 18, the driver returns to the operating platform along the distance C'. In this, the distance C' corresponds to distance D of FIG. 1. Due to the geometry of the ways, significantly longer distances are covered by the driver in the conventional commissioning process than in the utilisation of the horizontal order-picker according to the present invention. In addition, usually the offset A' is selected to be greater by a driver in the state of the art when he approaches the pick-up point 20, in order to reach the order-picking containers better along the distance B'. This does also not apply with the horizontal order-picker according to the present invention, using which the distance A can also be selected to be significantly shorter.

Figure 2:
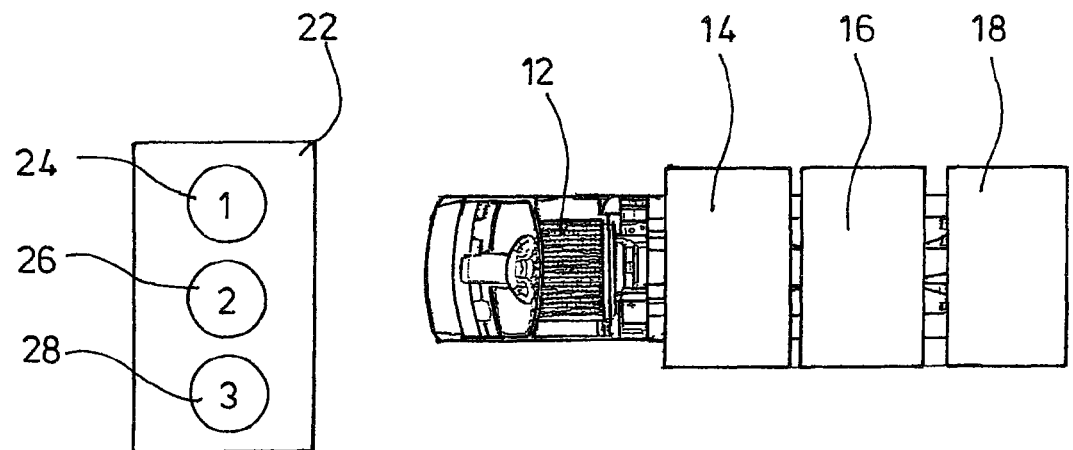
FIG. 2 shows in a schematic view selection means for the order-picking containers.

FIG. 2 shows a preferred embodiment, in which a schematically shown operational control 22 is provided in the operating platform 12. The operational control 22 has three switching means 24, 26, 28 by which the order-picking container 14, 16, 18 to be filled up can be selected before or when leaving the horizontal order-picker.

In the horizontal order-picker according to the present invention, a movement operation is triggered by actuating the operational control 22 only then when the vehicle is in complete standstill. Preferably, a small delay may still be provided here, which permits that the driver leaves the operating platform 12 and places himself at the pick-up point 20.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A horizontal order picker (10) with an operating platform (12) and a load section which is provided for accommodating several order-picking containers (14, 16, 18), one after another in a travel direction (F), wherein an operational control (22) is provided in the operating platform (12) and said operational control (22) has switching means (24, 26, 28) which permit to select one of the several order-picking containers (14, 16, 18), upon actuation of said switching means of the operation control the horizontal order picker moves in the travel direction (F) for a predetermined distance (D) automatically, the length of the distance (D) to be moved corresponds to the offset between the operating platform (12) and the selected order-picking containers (14, 16, 18).

2. The horizontal order picker according to claim 1, characterised in that the direction of movement (F) is selected such that after moving, one of the order-picking containers (14, 16, 18) is in a position (20) in which the operating platform (12) had been before the movement.

3. The horizontal order picker according to claim 1, characterised in that the operational control triggers a movement of the vehicle after the vehicle had been braked down into standstill.

4. The horizontal order picker according to claim 1, characterised in that a sensor is provided which acquires the distance to be moved and stops the automatic movement process when an obstacle appears.

5. The horizontal order picker according to claim 1, characterised in that the sensor is realised as radar.

6. A horizontal order picker comprising:
an operating platform;
a load section which is provided for accommodating several order-picking containers, one after another in a travel direction (F);
an operational control is provided in the operating platform, the operational control having a switch which permits the selection of one of the several order-picking containers, upon actuation of the switch the horizontal order picker moves in the travel direction (F) for a predetermined distance (D) automatically, the length of the distance (D) to be moved corresponds to an offset between the operating platform and the selected order-picking containers.

\* \* \* \* \*